United States Patent [19]
Jeannin

[11] Patent Number: 6,088,397
[45] Date of Patent: Jul. 11, 2000

[54] METHOD OF ESTIMATION OF MOTION BETWEEN IMAGES

[75] Inventor: Sylvie Jeannin, Paris, France

[73] Assignee: U.S. Philips Corporation, New York, N.Y.

[21] Appl. No.: 09/202,890

[22] PCT Filed: Mar. 23, 1998

[86] PCT No.: PCT/IB98/00424

§ 371 Date: Dec. 22, 1998

§ 102(e) Date: Dec. 22, 1998

[87] PCT Pub. No.: WO98/49830

PCT Pub. Date: Nov. 5, 1998

[30] Foreign Application Priority Data

Apr. 25, 1997 [EP] European Pat. Off. .............. 97400944

[51] Int. Cl.$^7$ ...................................................... H04N 7/00
[52] U.S. Cl. ............................ 375/240; 348/409; 382/238
[58] Field of Search ..................................... 348/394, 402, 348/407, 409; 375/240; 382/238

[56] References Cited

U.S. PATENT DOCUMENTS

| | | | |
|---|---|---|---|
| 5,751,362 | 5/1998 | Lee ........................................... | 348/416 |
| 5,764,805 | 6/1998 | Martucci et al. ........................ | 382/238 |
| 5,929,940 | 7/1999 | Jeannin .................................... | 348/699 |
| 5,995,668 | 11/1999 | Corset et al. ............................ | 382/233 |

FOREIGN PATENT DOCUMENTS

| | | |
|---|---|---|
| 0771115A1 | 5/1997 | European Pat. Off. . |
| 9716030A1 | 5/1997 | WIPO . |

OTHER PUBLICATIONS

"Differiential Methods for the Identification of 2D and 3D Motion Models in Image Sequences", by Jean–Luc Dugelay et al, Signal Processing Image Communication, vol. 7, 1995, pp. 105–127.

"Coding of Arbitrarily Shaped Image Segments Based on a Generalized Orthogonal Transform", by Michael Gilge et al., Signal Processing Image Communication, vol. 1, 1989 pp. 153–180.

*Primary Examiner*—Chris S. Kelley
*Assistant Examiner*—Ly Duy Pham

[57] ABSTRACT

The invention relates to a method and device for estimating motion between images forming a sequence of segmented images or partitions composed of I regions $R_i$ identified by labels. The method comprises a step of initializing motion parameters of each region $R_i$, an intermediate processing step of the images on which the estimation of the motion is performed, and an iterative refining step for the definitive determination of said motion parameters in the form of a vector $(D_x, D_y)$ for all the pixels of each of the regions $R_i$. This refining step, including a minimizing operation of the prediction errors over each object by means of the minimization of an associated function, allows to select the most representative points and reject the others as outliers. Application: very low bitrate coding, multimedia applications.

7 Claims, 4 Drawing Sheets

$$\rho(x,\sigma) = \log\left(1 + \frac{x^2}{2\sigma^2}\right)$$

$$\psi(x,\sigma) = \frac{2x}{2\sigma^2 + x^2}$$

METHOD OF ESTIMATION OF MOTION BETWEEN IMAGES

BACKGROUND OF THE INVENTION

The invention relates to a method of estimating motion between images forming a sequence P(t−n), P(t−n+1), ..., P(t−2), P(t−1), P(t), ..., and available in the form of a sequence S(t−n), S(t−n+1), ..., S(t−2), S(t−1), S(t), ..., of segmented images or partitions composed of I regions $R_i$ identified by labels, said method comprising, for supplying for each region $R_i$ an information $M_i(t)$ representative of the motion of the current image P(t) with respect to the previous image P(t−1), the following three operations, performed for each region of said current image:

(1) a first step of initializing motion parameters of each region $R_i$ of P(t) as a function of the images P(t−1), P(t) before segmentation and S(t−1), S(t) after segmentation, and of the motion information $M_i(t-1)$ estimated for the previous image P(t−1) in a previous performance of the method;

(2) a second step for an intermediate processing of the images on which the estimation of the motion is performed, and a third refining step for the definitive determination of said motion parameters in the form of a vector (Dx, Dy) for all the pixels of each of the regions $R_i$, in such a way that, for each coordinate point (x,y) of the region, L(x,y,t)=L(x−Dx, y−Dy, t−1), L(.) designating the luminance or a more complex video signal and Dx, Dy being polynomials the degree of which is related to the type of motion of the region;

(3) the iterative repetition of said second and third steps of intermediate processing and refinement, until the end of this iterative process as a function of at least a given criterion so as to finally obtain the motion information $M_i(t)$.

The invention also relates to a device for implementing said method.

The invention is particularly suitable for encoding video signals in the field of very low bitrates and in the field of low bitrates up to approximately 1 Mbit/second. This range of bitrates notably corresponds to consumer applications, often termed as multimedia applications.

The european patent application EP 0771115 (PHF96534) describes a method and device the main characteristics of which will be hereunder recalled. Before doing that, the notations used throughout the description are first indicated. The images here considered form part of an original sequence of textured images, denoted P(t−n), P(t−n+1), ..., P(t−2), P(t−1), P(t), etc. In the description which follows, the focus is principally on P(t), the current image, and on P(t−1) which is the previous original image (or the previous encoded image, in accordance with the characteristics of the encoding process performed after the motion estimation). From a practical point of view, these two textured images P(t−1) and P(t), between which the motion estimation is carried out at the time t, are the images of the luminance signal in this case, but may also correspond either to a combination of luminance and chrominance signals, in case the color contains much specific information, or to any other transform of original images restituting the information of the signal. The value of the luminance at an arbitrary point (x,y) in one of the images P(t−2), P(t−1), P(t), etc. is denoted L(x,y,t−2), L(x,y,t−1), L(x,y,t), etc. Concerning the operation of segmenting the images, a sequence of images of labels (these images are also referred to as partitions) corresponds to the sequence of original images, while the segmented images are referred to as S(t−2), S(t−1), S(t), etc . . . and correspond to the original textured images P(t−2), P(t−1), P(t), etc . . . , and finally form a sequence of a certain type of images resulting from a pre-analysis which is required to carry out the motion estimation method. FIG. 1 illustrates an example of segmenting an image into seven regions $R_i$, with i=0 to 6.

The information relating to the motion of the current image P(t) with respect to the previous image P(t−1) is arranged under the reference $M_i(t)$ for the region $R_i$ of the image P(t). This reference $M_i(t)$ includes the data constituted by the type of motion retained (i.e. the order or degree of the polynomial representing this motion) and the values of the corresponding parameters (i.e. the values of the coefficients of the polynomials). For example, as illustrated in FIG. 2, a displacement vector (Dx,Dy) from P(t−1) to P(t), with Dx and Dy being polynomials whose coefficients are the motion parameters, corresponds to a type of motion determined between the images P(t−1) and P(t) at a point (x,y) of a region $R_i$ of P(t). This can be written as L(x,y,t)=L(x−Dx, y−Dy,t−1). The degree of these polynomials (0, 1 or 2) and the number of coefficients defining them (from 2 to 12 parameters) depend on the type of motion considered:

(a) two parameters are sufficient for defining the translation of a plane facet parallel to the image in a plane parallel to the image:

$Dx=a_1$ $Dy=a_2$ (b) for a motion of the zoom and/or panning type, four parameters are necessary for modelling the motion of translation of a plane facet parallel to the plane of the image if the facet has an arbitrary orientation, or has an arbitrary translation motion of this facet if it is parallel to the plane of the image:

$Dx=a_1+a_2x+a_3y$ $Dy=a_4-a_3x+a_2y$ (c) for a related transform, six parameters are necessary for modelling a translation motion as indicated under (b) above or a rotational motion of a plane facet around an axis perpendicular to the plane of the image:

$Dx=a_1+a_2x+a_3y$ $Dy=a_4+a_5x+a_6y$ (d) for a quadratic motion, twelve parameters are necessary for modelling arbitrary rotations and translations of the curved facets:

$Dx=a_1+a_2x+a_3y+a_4x^2+a_5xy+a_6y^2$ $Dy=a_7+a_8x+a_9y+a_{10}x^2+a_{11}xy+a_{12}y^2$

These polynomial models have been adopted because it is possible to show that they represent the motion of objects in a satisfactory manner. However, they cannot be interpreted as a strict description of the real three-dimensional motion of these objects. For this purpose, it is necessary to have the certainty that the objects are rigid and that their form is also known, which is not the case. The models in question are thus simply a representation of the deformation of the projection of the objects in the image plane (for example, in the case of two parameters, the model effectively describes a translation in the image plane, supposing that the object concerned is rigid and has a plane surface which is parallel to the image plane). A detailed representation of these motion models is given, for example in the article "Differential methods for the identification of 2D and 3D motion models in image sequences", J. L. Dugelay and H. Sanson, Signal Processing: Image Communication, Vol. 7, No. 1, March 1995, pp. 105–127.

The coordinates of a point in an image are denoted throughout the description in capitals (X,Y) or not (x,y), dependent on whether they are expressed with respect to a global reference related only to the image or with respect to a local reference related to a given region of the image.

It is here useful also to recall that, in this case, the objective of motion estimation is to provide the possibility of subsequently restoring a predicted image R(t) constituting an approximation of P(t), based on the segmented image S(t), on the previously restored image R(t−1) corresponding to P(t−1), and on information $M_i(t)$ obtained during the motion estimation. Such a determination of R(t) provides, inter alia, the subsequent possibility of encoding the prediction error only, i.e. the difference between P(t) and R(t).

The method presented in the document previously cited can now be described in detail with reference to FIG. 3. It comprises successively a first step 10 of initializing the motion parameters (INIT), a second pre-processing step 20 (PPRO), and a third step 30 of refining the motion parameters (REFT), each one being performed for each region of the current image.

The first step 10 of initializing the motion parameters has for its object to start the motion estimation process with motion parameter values for each region $R_i$ of the image P(t) considered, which values are as close as possible to the final real values of these parameters so as to be able to suppose, throughout the processing operations envisaged, that the motion parameters have small variations. Moreover, the required execution time for obtaining a given estimation quality is, on average, shorter if one starts the estimation process with parameter values which are closer to the searched real values, which additional execution time of said first initialization step is negligible with respect to that of the estimation itself. It should be prevented that in the course of these processing operations, which, as will be seen, are implemented in an iterative manner, the convergence can be produced at a local minimum, which would have more chances of being produced if the initial values were too remote from said searched real values.

In three sub-steps referenced (A), (B) and (C) and performed for each region $R_i$ of the image P(t), the first step thus consists of:

(A) exploiting at best the information which is initially available at the input, and possibly gathering new information for deducing probable motion hypotheses;

(B) for each of said motion hypotheses (expressed hereinafter) and based on known data for the image P(t−1), predicting the region concerned in P(t) and computing the corresponding prediction error;

(C) selecting, as initial values of the motion parameters, those values which generate the smallest prediction error (which simultaneously validates one specific motion hypothesis).

The first sub-step (A) of the step 10 of initialization INIT consists of exploiting the initial data, which are:

(a) the original images P(t−1) and P(t);
(b) the images of the labels S(t−1) and S(t);
(c) the data $M_i(t-1)$, i.e. the motion information (type of motion and values of corresponding parameters), including the case where the motion is zero, permitting, during the previous cycle (i.e. based on the image P(t−2)) to know the motions which lead to the image P(t−1);

(d) the data resulting from performing the BMA technique (described above) between the images P(t−1) and P(t), namely a displacement vector defined for each pixel of P(t), and in general at about one pixel (or possibly at about half a pixel).

For each region $R_i$ of P(t), four motion hypotheses with respect to the previous image have successively been taken into consideration in this case, taking their complementarity and simplicity of formulation into account in view of the available information:

(1) the motion of the region $R_i$ is zero;

(2) the label i considered already existed in S(t−1) and the motion of the region is only a translation parallel to the image plane: it is then sufficient to compute the coordinates of the center of gravity of the label i in S(t−1) and S(t) and then the difference between these coordinates, which yields the displacement vector;

(3) the label i considered was already existing in S(t−1): j designating each label near i in S(t−1) and the data $M_i(t-1)$ and $M_j(t-1)$ being expressed in the local reference associated with i, all the labels j neighboring i in S(t−1) are searched and then the corresponding data $M_j(t)$ are read (type of motion and values of corresponding parameters converted in this local reference), and the best motion between the label i and its neighboring labels is chosen;

(4) the considered motion is that which corresponds to the best approximation of the field of displacement vectors resulting from an adaptation of the BMA technique per region (only the displacements computed for blocks of more than half the number included in the region i considered being taken into account), said adaptation consisting of a sequence of translational motion estimations of blocks having a variable size and of relaxations so as to subsequently determine an approximation of the field of vectors by means of a more complex model and with the aid of a regression technique (this method of adapting the polynomial from a set of values is similar to the polynomial approximation method described, for example for encoding textured images, in the article "Coding of arbitrarily shaped image segments based on a generalized orthogonal transform", by M. Gilge, T. Engelhardt and R. Mehlan, "Signal Processing: Image Communication", Vol. 1, No. 2, October 1989, pp. 153–180, which example is not limitative).

The second sub-step (B) of the step 10 for initialization INIT consists of predicting, on the basis of P(t−1), the corresponding region in P(t), taking into account each motion hypothesis effected during the sub-step (A), and of subsequently computing each time the prediction error for the region. The following prediction principle is used: with P(t−1), S(t) and $M_i(t)$ being known, the predicted luminance value in the image P(t) is determined at a position (X,Y) of a pixel. The detailed description of the prediction will be given hereinafter in the part dealing with the refinement, for the definitive estimation of the motion parameters.

Finally, the third sub-step (C) of the step 10 for initialization INIT consists of comparing the computed prediction errors in a region and of preserving, as initial motion of the region, that one to which the smallest prediction error corresponds. The process is repeated for each region and the first initialization step 10 is ended when the motion parameters have thus been adjusted for all the regions of P(t). The set of initial parameters thus determined for a region $R_i$ is designated by the reference $$M_{12}^i(t)$$

in FIG. 3.

The second intermediate processing step 20 has for its object to facilitate the estimation of definitive motion parameters obtained at the end of the third and last step. Without this being the only possibility, an essential processing operation for obtaining this objective is to modify the luminance signal so as to bring it closer to the theoretical ideal (a first-order function) i.e. so as to verify the mathematical hypothesis required by the theory in order to obtain a convergence of the estimation process. This processing operation consists of a filtering of P(t−1) and of P(t), for example by using an isotropic Gaussian filter in the four directions of the plane (S(t−1), S(t), $M_f(t)$ are not modified). This choice of filter ensures a very good compromise between a smoothing of the contours, which is useful for simplifying the luminance signal in the image and facilitating the convergence by avoiding the local minima as much as possible, and the maintenance of a sufficient localization of these contours in the image (it is desirable to preserve enough details of the image in order that the precision of the estimated motion is sufficient). The filtered images are designated by the references P'(t−1) and P'(t) in FIG. 3. The set of motion parameters available after this preprocessing operation realized during step 20 is designated in FIG. 3 by the reference $M_{23}^i(t)$.

The third step 30 of refining the motion parameters, which step is iterative, has for its object to effect the definitive estimation of the motion parameters for the region concerned. The iterative process performed during this step ends at a given criterion, for example when a number of iterations fixed in advance is reached (other criteria may also be proposed, such as a stop of iterations when a sufficient quality during motion compensation permitting the previous motion estimation is reached or when the improvement for the new iteration becomes negligible, or even a combination of several criteria).

It should be here recalled that, for each region of P(t), a vector (Dx,Dy) is searched so that, for each point in the region, L(x,y,t)=L(x−Dx,y−Dy,t−1), in which Dx and Dy are polynomials of a degree related to the type of motion for the region considered. The equality between these two terms L(.) can only be realized in a more or less approximative manner in accordance with the degree of quality of the motion estimation. In order that this approximation is as satisfactory as possible, the criterion used is the one for determining the smallest quadratic error: the sum of the square values of the prediction errors in the pixels of the region is minimized, i.e. the following expression:

$$\Sigma(L(x,y,t)-L(x-Dx,y-Dy,t-1))^2 \quad (1)$$

for x and y taking all the values corresponding to the coordinates of the pixels in the region $R_i$ considered. This expression (1) is denoted in an abbreviated form in the following manner (DFD=Displaced Frame Difference):

$$\Sigma_{x,y}(DFD(x,y,Dx,Dy))^2 \quad (2)$$

It is known that such a mathematical minimizing operation (of expression (2)) may be notably effected by means of the Gauss-Newton method for which $Dx=(Dx_o+dx)$ and $Dy=(Dy_o+dy)$, with dx and dy being very small with respect to $Dx_o$ and $Dy_o$ respectively. By first-order development, we obtain:

$$L(x-Dx, y-Dy, t-1) = L(x-Dx_o, y-Dy_o, t-1) - \quad (3)$$
$$dx\left(\frac{\partial}{\partial x}L(x-Dx_o, y-Dy_o, t-1)\right) - $$
$$dy\left(\frac{\partial}{\partial y}L(x-Dy_o, y-Dy_o, t-1)\right)$$

The expression (1) to be minimized thus will be:

$$\sum_{x,y}\left[DFD(x,y,Dx_o,Dy_o) - dx\left(\frac{\partial}{\partial x}L(x-Dx_o, y-Dy_o, t-1)\right) - \quad (4)\right.$$
$$\left.dy\left(\frac{\partial}{\partial y}L(x-Dx_o, y-Dy_o, t-1)\right)\right]^2$$

In this expression (4), the derivatives with respect to each of the coefficients of dx and dy are made equal to 0 eliminated in order to characterize the minimum of this expression with respect to the motion parameters, which leads to a set of n equations with n unknown quantities.

The solutions of this set of equations are the variations of the motion parameters leading to the smallest quadratic error. To resolve this, it is expressed in a matrix form:

$$[A].[x]=[B] \quad (5)$$

The vector x represents the searched parameters and the terms of the matrices depend on the coordinates of the pixels of the current image, on the gradients which are horizontal and vertical to the previous positions of the pixels (in the previous image) and on the luminance values at these positions in the current and the previous image. For each region $R_i$ of S(t) and at each iteration, the matrices A and B must be constructed, the matrix A must be inverted and the inverse matrix thus obtained must be multiplied by the matrix B to obtain the vector solution x: the motion information (for the region $R_i$) may then be updated by adding components of this vector solution x to the previous expression of this motion information.

For constructing the matrix A, the luminance values must be computed at the points in the previous image corresponding to previous positions of the points in the current image, of which the motion and the positions in this current image are known—it is the prediction operation described below—and the values of the horizontal gradient and the vertical gradient at similar points must be computed. The computations must be performed on values of parameters expressed in their local reference (i.e. related to the region). For each region, two sets of parameters are stored, on the one hand, the parameters during estimation, while converging, which is denoted $M_i^{cv}(t)$, and, on the other hand, the parameters giving the best results for the region, which is denoted $M_i^f(t)$. At the start of the refinement step 30, these two motions are equal to the initial motion $$(M_{12}^i(t) \text{ in FIG. 3})$$

originating from the initialization of the processed parameters. Subsequently, $M_i^{cv}(t)$ is refined in an iterative manner and substituted at the end of each iteration for $M_i^f(t)$, which corresponds to the motion giving the best results among the following motions for the region under study: either the parameters $M_i^{cv}(t)$ correctly computed for the current region, or the parameters $M_j^{cv}(t)$ of the regions j neighboring i in S(t), which motions are reconverted in the local reference corresponding to the region i. Finally, this retained motion may give rise to a propagation towards the neighboring regions: for these neighboring regions, the search for the smallest prediction error on the basis of this motion is resumed, which is selected if it effectively leads to a smaller prediction error, and so forth. At the output of each iteration of the refinement step, the motion information determined for each region i of S(t) is sent towards the input of step 20 (parameters designated by $$M_{32}^i(t)$$

in FIG. 3).

The prediction operation which is necessary for the construction of the matrix A is now described. Given a pixel of coordinates (X,Y), the prediction enables the determination of the predicted luminance value at this position at the instant t, denoted L(X,Y,t), based on S(t), P(t−1) and M(t). This operation, which is performed at each point of the image, consists of two steps:

(a) computation of the non-integral coordinates of this pixel at the instant (t−1):
search of the label i of the region which the pixel belongs to by reading the image of the labels S(t) at the position (X,Y);
for this pixel, selection of its motion information (type of motion and value of the parameters) by reading $M_i(t)$ for this label;
computation of the displacement (Dx,Dy) of the pixel as a function of its coordinates, of the type of motion and the value of the parameters of its region (for example, in the case of a related motion, for which there are 6 parameters, one has: (Dx,Dy)=($a_1+a_2.X+a_3.Y, a_4+a_5.X+a_6.Y$) if the motion parameters are expressed with respect to the global reference, or (dx,dy)=($a_1+a_2.x+a_3.y, a_4+a_5.x+a_6.y$) if the motion parameters are expressed with respect to a local reference at their region), said displacement thus providing the possibility for this pixel of deducing its coordinates at (t−1): (X−Dx,Y−Dy) (if these coordinates are outside the image, one takes the coordinates of the closest point associated with the image, but the coordinates found are not necessarily integral values because the parameters are not, and thus an interpolation must be carried out for deducing the luminance at this point);

(b) computation of the luminance and its coordinates in P(t−1): the luminance is interpolated in the present case by using a bicubic monodimensional filter having a length 5 with a precision of 1/16th of a pixel (the interpolation is effected horizontally and vertically with the same filter, by means of an operation referred to as mirroring at the edges of the image in the case of pixels at the edge of the image so as to obtain two luminance values, the mean value of which is preserved).

For the computations of the gradient, it is necessary to interpolate their values, similarly as for the luminance. To ensure the coherence of this operation with the interpolation used during prediction, the filter used is derived from that used for the luminance, of length 5, with a precision at 1/32nd of a pixel. The interpolation technique is the same as for the luminance, except that the values resulting from the horizontal and vertical filtering operations are used independently and are thus not averaged (the same mirroring operation as for the luminance may be performed).

In theory, the matrix A must be constructed with the aid of a sum of terms at all the points of the region. Certain points may be error factors (association with a small object or parasitic motion, with an uncovered zone ... ). A simple restriction of selecting the points is to preserve only the points (x,y) whose motion actually estimated is such that S(x,y,t)=S(x−Dx,y−Dy,t−1). This restriction is the more efficient as the segmentation is more coherent with the contents of the image.

Once the matrix A is constructed, it is tested whether it is singular or not. If it is not, an inversion by means of the method referred to as the Householder method is performed. If it is, the motion is not refined: the motion parameters (the information $M_i^{cv}$) remain unchanged at the start of this iteration and one proceeds directly to the selection of the better motion. The region is predicted by using both the information $M_i^{cv}(t)$ which has been supplied in the refinement step and the information $M_j(t)$ corresponding to every region j neighboring i in S(t) and expressed in the local reference at i. The prediction error in the region is computed each time. If all the errors are higher than those corresponding to the previous information $M_i^f(t)$, this better motion remains unchanged. If not, the motion generating the smallest prediction error is definitively retained, and the corresponding, new information is denoted $M_i^f(t)$. As has been seen above, a controlled propagation of the retained motion is possible. For each region $R_j$ adjacent to $R_i$, the prediction error in this region is computed on the basis of parameters $M_i^f(t)$, and $M_j^f(t)$ is substituted by $M_i^f(t)$ if this error is smaller than the prediction error obtained from $M_j(t)$.

With such an estimation scheme, the initialization step allows to use all the available information in order to start the estimation not too far from the motion to find, while the preprocessing step simplifies the luminance signal (in order to make the convergence avoid local minima: an image pyramid is built by successive filtering operations, the first estimation occurring between a pari of strongly filtered images) and the refinement one works on the more detailed images.

SUMMARY OF THE INVENTION

An object of the invention is to propose an estimating method in which a more robust way is used for the estimation of the polynomial motion parameters of video objects of given sequences.

To this end, the invention relates to an estimating method as described in the preamble of the description and that is moreover characterized in that said third refining step includes a minimizing operation of the prediction errors over each object whose motion is estimated, by means of the minimization of an associated function ρ(x), called objective function, according to the formula min $\Sigma_p \rho(r_p)$ where $r_p$ is for each pixel p of each object the prediction error, a prediction error being defined as the difference between original and predicted values, and the motion estimation being based on the assumption that the luminance changes in time are only due to said motion, without consideration of local illumination changes.

Another object of the invention is also to propose a device for implementing said estimating method.

To this end, the invention relates to a device for estimating motion between images forming a sequence P(t−n), P(t−n+1), ... , P(t−2), P(t−1), P(t), ... , and available in the form of a sequence S(t−n), S(t−n+1), ..., S(t−2), S(t−1), S(t), ..., of segmented images or partitions composed of I regions $R_i$ identified by labels, said device successively comprising, for supplying, per region $R_i$ and in the form of a motion vector defined by motion parameters, information $M_i(t)$ which is representative of the motion of the current image P(t) with respect to a previous image P(t−1), the following three stages, namely a first stage for initializing the motion parameters of each region of the current image by selecting motion hypotheses and by choosing, for each region, that motion for which the sum of the square values of the prediction errors in the pixels of the image of the region is minimal, a second stage for intermediate processing, and a third stage for refining the motion parameters by an approximated determination of the vector (Dx,Dy) associated with each region, said second and third stages being provided in a loop in accordance with an iterative process until the end of this process as a function of a given criterion, and said refining stage comprising means for minimizing the prediction errors over each object whose motion is estimated, by means of the minimization of an associated function $\rho(x)$, called objective function, according to the formula min $\Sigma_p \rho(r_p)$ where $r_p$ is for each pixel p of each object the prediction error.

BRIEF DESCRIPTION OF THE DRAWINGS

These and other aspects of the invention will be apparent from and elucidated with reference to the embodiments described hereinafter.

DETAILED DESCRIPTION OF THE PREFERRED EMBODIMENTS

According to the invention, it is therefore proposed, for a better estimation of the motion parameters, to introduce the so-called M-estimators in the differential estimation process. In fact, the problematic of motion parameters estimation may be written as a minimization of a function of a prediction error, said function $\rho$ being called objective function and said minimization being written according to the following relation:

$$\min \sum_p \rho(r(p)) \tag{6}$$

where r(p) is the prediction error at the pixel p of the object. An M-estimation then resolves the problematic of the minimization of said sum of the prediction error by using an objective function $\rho(x)$ that is symmetric, positive-definite, and has a unique minimum at x=0. In order to be denoted as robust estimator, the function $\rho(x)$ should be chosen so that the influence that the points of large prediction error (usually called outliers) have on the convergence process is reduced. The type of selection operated by $\rho(x)$ on pixels of given prediction error values is characterized by the influence function of $\rho(x)$. In the continuous case, the influence function, $\psi(x)$, is the derivative of $\rho(x)$. In order to reduce the influence of points of large prediction error in the above-given minimization relation, $\psi(x)$ should tend towards zero when x tends to the infinite.

Numerous robust M-estimators have been used in literature, in various scopes, for their ability to reduce the influence of outliers. In the most simple cases, $\rho(x)$ is not differentiable: the outlier/inlier decision is binary, based on the comparison of the error to a given threshold. A finer analysis can be obtained with more elaborated M-estimators, and by using scale factors which allow to control the sharpness of the functions, i.e. the tolerance of the M-estimators to outliers, without changing their statistical properties. In all the cases, the minimization problem corresponding to said minimization relation has no direct solution. The so-called Iteratively Reweighted Least Square method (IRLS) however enables the resolution of M-estimation, by converting it into an equivalent weighted least square problem. Indeed, by differentiating the minimization relation with respect to the motion parameters and after a few more manipulations, the problem can be shown to be equivalent to:

$$\min \sum_p 1/2 w_p r^2 p \tag{7}$$

where $w_p$ is the weight of the pixel p, and $$wp = 1/rp \, d\rho(rp)/drp \tag{8}$$

Figure 1:
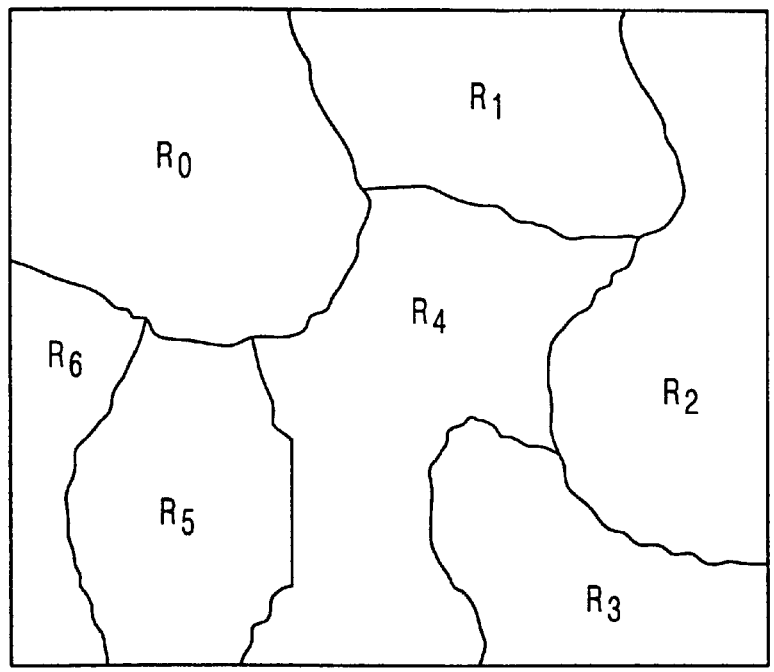
FIG. 1 shows an example of a segmented image, the segmentation resulting from a pre-analysis of the original image (it will be noted that the principle of segmentation itself, in whichever form, does not form part of the invention)
Figure 2:
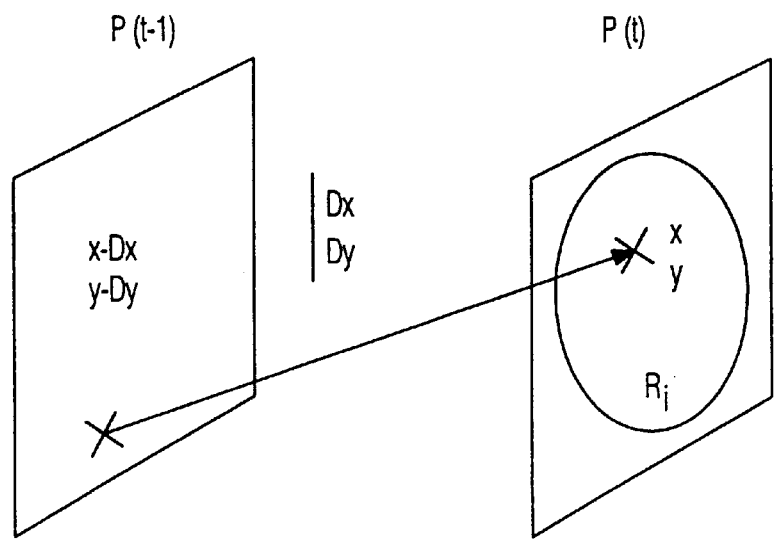
FIG. 2 diagrammatically shows a motion between two successive images P(t−1) and P(t)
Figure 3:
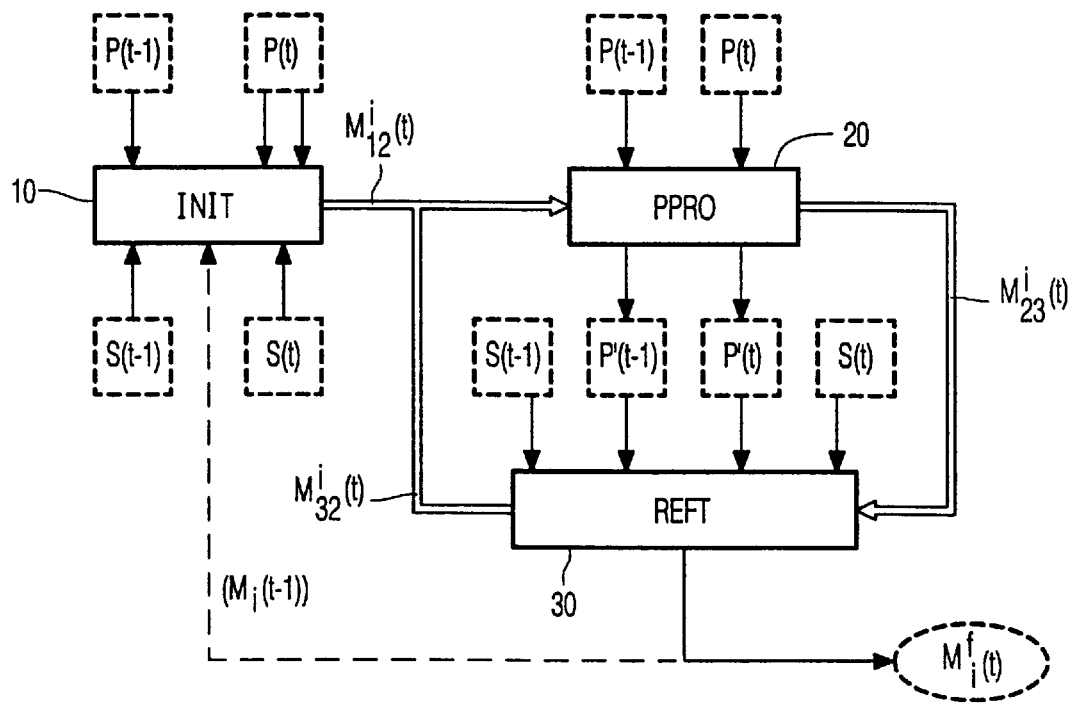
FIG. 3 illustrates the steps of the estimation process described in the document EP 0771115 previously cited.
Figure 4:
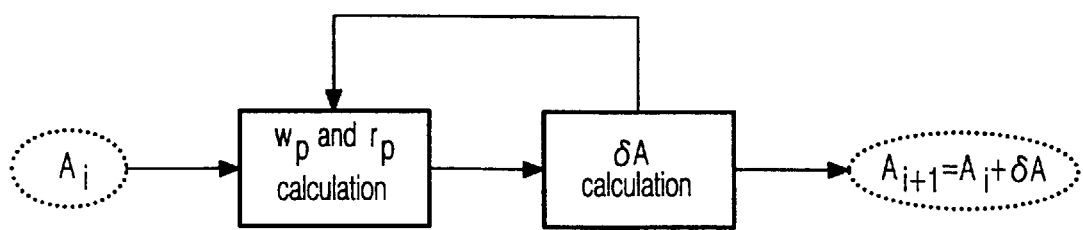
FIG. 4 illustrates the iterative parameters estimation according to the so-called IRLS method.

Then, a classical minimization method can be applied (gradient method, Newton method, Gauss-Newton method, and so on, the last one being in fact very often used for the good trade-off it allows to obtain between performance and complexity). The IRLS method thus applied proved to converge quickly. The iterative parameters estimation using it is summarized in FIG. 4, where Ai and Ai+1 denote the motion parameters estimate at the ith and (i+1)th iterations, and δA the calculated refinement of this estimate.

Figure 5:
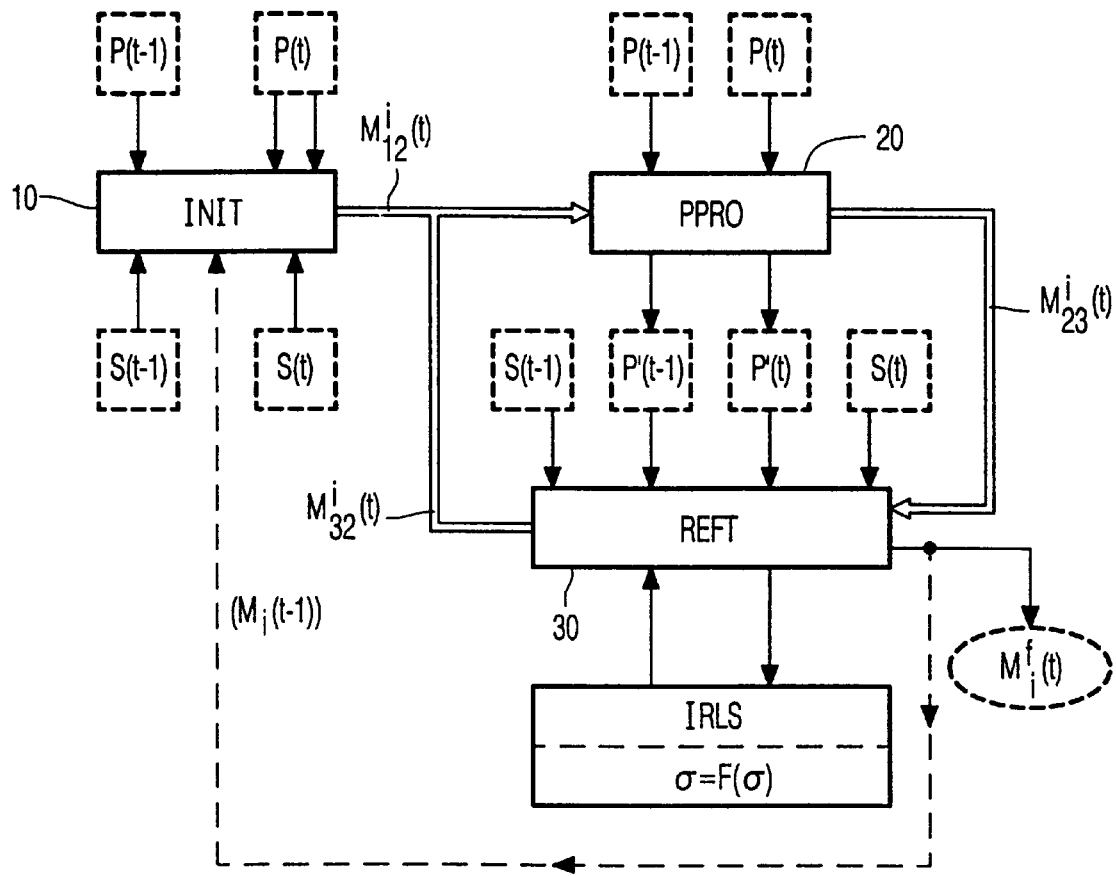
FIG. 5 illustrates the steps of the estimation process according to the present invention.

However M-estimators are known to be very sensitive to the convergence process initialization. There is no way to a priori decide whether or not a pixel is an outlier at the beginning of the process. In some estimation environments, enough a priori information may exist to ensure a very reliable initialization of motions and outliers. To face the other cases, a solution that proved satisfactory is then to use a scale factor, so that the estimation starts with a high tolerance to outliers and progressively strengthens the selection as the motion estimate becomes more precise. The monitoring of the scale factor is of critical importance for the quality of the result: its value has to be large at the beginning of the estimation, and should be regularly decreased until an ending value. The global estimation framework, when M-estimators and thus IRLS are used, is described in FIG. 5.

Figure 6:
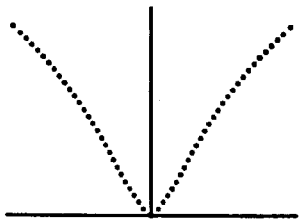
FIG. 6 shows an example of objective function $\rho(x)$ as used in the case of the invention.
Figure 7:
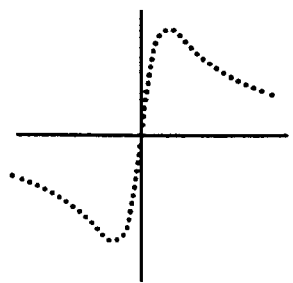
FIG. 7 shows the influence function associated to said objective function.

For motion estimation purpose, it is not optimal to rely only on the prediction error to perform the outlier/inlier selection. In fact, some points of large prediction errors would certainly prejudice the convergence, because they belong to a subregion undergoing a minority motion for instance. But some others contain very useful information for the convergence. For motion estimation, the most interesting information in images are located in high gradient areas (flat areas can only give an imprecise idea of the motion), where small errors on motion parameters induce large prediction errors. If the outlier/inlier selection relies only on the prediction error, interesting points are rejected as outliers, and cannot contribute any longer to the convergence process. As M-estimators perfectly handle the case of object only with a uniform gradient share-out, a mechanism has been set up in order to adapt the outliers selection to the motion estimation problematic. Real outliers, due to the limitations of the motion model and disturbing the convergence process, will be discriminated from pixels inducing large prediction errors but carrying useful information. Since each pixel influence is determined by its weight $w(p,\rho,\sigma)$ ($\sigma$ being the scale factor), the weighting function is modified in order to take into account the gradient information. It is proposed to redefine the weighting function as w', a linear combination of the normalized initial weighting function $w_n(p,\rho,\sigma)$ and the normalized image gradient $g_n(p)$. In the case of the Lorentzian M-estimator such as presented in FIG. 6 (with its associated influence function $\psi(x,\rho)$ in FIG. 7), this would for instance lead to:

$$w'(p,\rho,\sigma)=w_n(p,\rho,\sigma)+\alpha(1-w_n(p,\rho,\sigma)).g_n(p) \quad (9)$$

with:

$$w_n(p,\rho,\sigma) = \frac{2\sigma^2}{2\sigma^2 + r^2(p)} \quad (10)$$

and where $\alpha$ controls the respective importance given to gradient and prediction error in the outlier discrimination process.

Figure 8:
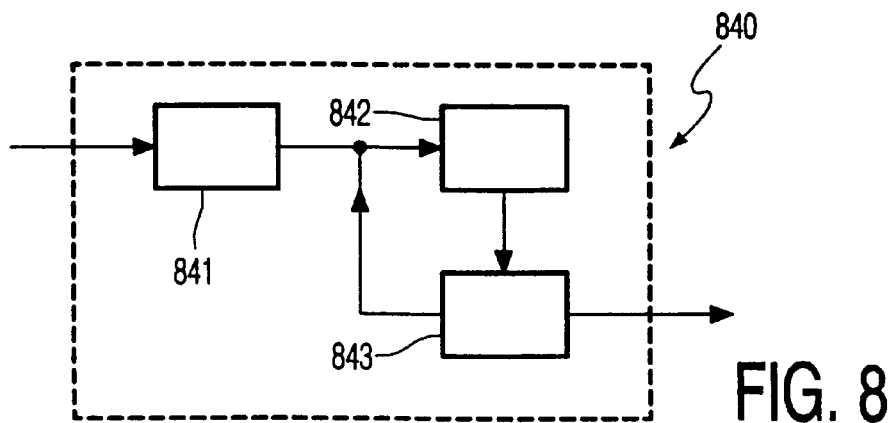
FIG. 8 shows an example of a motion estimation device provided for performing the method according to the invention.

As previously indicated in the document EP 0771115, the present method may also be implemented in a motion estimation device 840 shown in FIG. 8, which comprises a first stage 841 for initializing the motion parameters of each region of the current image, for performing the first initialization step 10 by selecting the motion hypotheses and by choosing, for each region, that motion for which the sum of the square values of the prediction errors in the pixels of the region is minimal, followed by a second intermediate processing stage 842 for performing the second step 20, and a third stage 843 for refining the motion parameters, for performing the third step 30 by an approximated determination of the vector (Dx,Dy) associated with each region. These second and third stages 842 and 843 are provided in a loop in accordance with an iterative process until the end of this process as a function of a given criterion (in this case, the intermediate processing operation comprises an isotropic Gaussian filtering operation intended to accelerate the convergence of this iterative process). It can be also indicated that a particularly important use of this motion estimation device may be found in a system for encoding segmented images as described in the European Patent Application No.0799550 (PHF96-542).

What is claimed is:

1. A method of estimating motion between images forming a sequence P(t-n), P(t-n+1), . . . , P(t-2), P(t-1), P(t), . . . , and available in the form of a sequence S(t-n), S(t-n+1), . . . , S(t-2), S(t-1), S(t), . . . , of segmented images or partitions composed of I regions $R_i$ identified by labels, said method comprising, for supplying for each region $R_i$ an information $M_i(t)$ representative of the motion of the current image P(t) with respect to the previous image P(t-1), the following three operations, performed for each region of said current image:

(1) a first step of initializing motion parameters of each region $R_i$ of P(t) as a function of the images P(t-1), P(t) before segmentation and S(t-1), S(t) after segmentation, and of the motion information $M_i(t-1)$ estimated for the previous image P(t-1) in a previous performance of the method;

(2) a second step for an intermediate processing of the images on which the estimation of the motion is performed, and a third refining step for the definitive determination of said motion parameters in the form of a vector (Dx, Dy) for all the pixels of each of the regions $R_i$, in such a way that, for each coordinate point (x,y) of the region, L(x,y,t)=L(x-Dx, y-Dy, t-1), L(.) designating the luminance or a more complex video signal and Dx, Dy being polynomials the degree of which is related to the type of motion of the region;

(3) the iterative repetition of said second and third steps of intermediate processing and refinement, until the end of this iterative process as a function of at least a given criterion so as to finally obtain the motion information $M_i(t)$;

characterized in that said third refining step includes a minimizing operation of the prediction errors over each object whose motion is estimated, by means of the minimization of an associated function $\rho(x)$, called objective function, according to the formula min $\Sigma_p \rho(r_p)$ where $r_p$ is for each pixel p of each object the prediction error, a prediction error being defined as the difference between original and predicted values, and the motion estimation being based on the assumption that the luminance changes in time are only due to said motion, without consideration of local illumination changes.

2. A method according to claim 1, wherein said objective function $\rho(x)$ is a so-called influence function, being symmetric, positive-definite, and with an unique minimum at x=0.

3. A method according to claim 2, wherein said objective function is given by $\rho(x)=x^2$.

4. A method according to claim 2, wherein said objective function is given by:

$$\rho(x,\sigma) = \log\left(1 + \frac{x^2}{2\sigma^2}\right)$$

where $\sigma$ is a scale factor controlling the sharpness of the function, said sharpness corresponding to the degree of tolerance to the points of large prediction error, or outliers.

5. A method according to claim 1, wherein said minimizing operation is performed according to a second formula min $\Sigma_p(w_p r_p^2)/2$, where $w_p$ is the weight of the pixel p, given by $w_p=(1/r_p)d\rho(r_p)/dr_p$.

6. A device for estimating motion between images forming a sequence P(t-n), P(t-n+1), . . . , P(t-2), P(t-1), P(t), . . . , and available in the form of a sequence S(t−n), S(t−n+1), . . . , S(t−2), S(t−1), S(t), . . . , of segmented images or partitions composed of I regions $R_i$ identified by labels, said device successively comprising, for supplying, per region $R_i$ and in the form of a motion vector defined by motion parameters, information $M_i(t)$ which is representative of the motion of the current image P(t) with respect to a previous image P(t−1), the following three stages, namely a first stage for initializing the motion parameters of each region of the current image by selecting motion hypotheses and by choosing, for each region, that motion for which the sum of the square values of the prediction errors in the pixels of the image of the region is minimal, a second stage for intermediate processing, and a third stage for refining the motion parameters by an approximated determination of the vector (Dx,Dy) associated with each region, said second and third stages being provided in a loop in accordance with an iterative process until the end of this process as a function of a given criterion, and said refining stage comprising means for minimizing the prediction errors over each object whose motion is estimated, by means of the minimization of an associated function ρ(x), called objective function, according to the formula min $\Sigma_p \rho(r_p)$ where $r_p$ is for each pixel p of each object the prediction error.

7. A device according to claim 6, wherein said minimizing operation is performed according to a second formula $$\min \Sigma_p (w_p r_p^2)/2,$$

where $w_p$ is the weight of the pixel p, given by $$w_p = (1/r_p) d\rho(r_p)/dr_p.$$

\* \* \* \* \*